Nov. 2, 1943. F. L. PRESCOTT 2,333,122
TORSIONAL VIBRATION DAMPING MEANS
Filed July 11, 1941 2 Sheets-Sheet 1
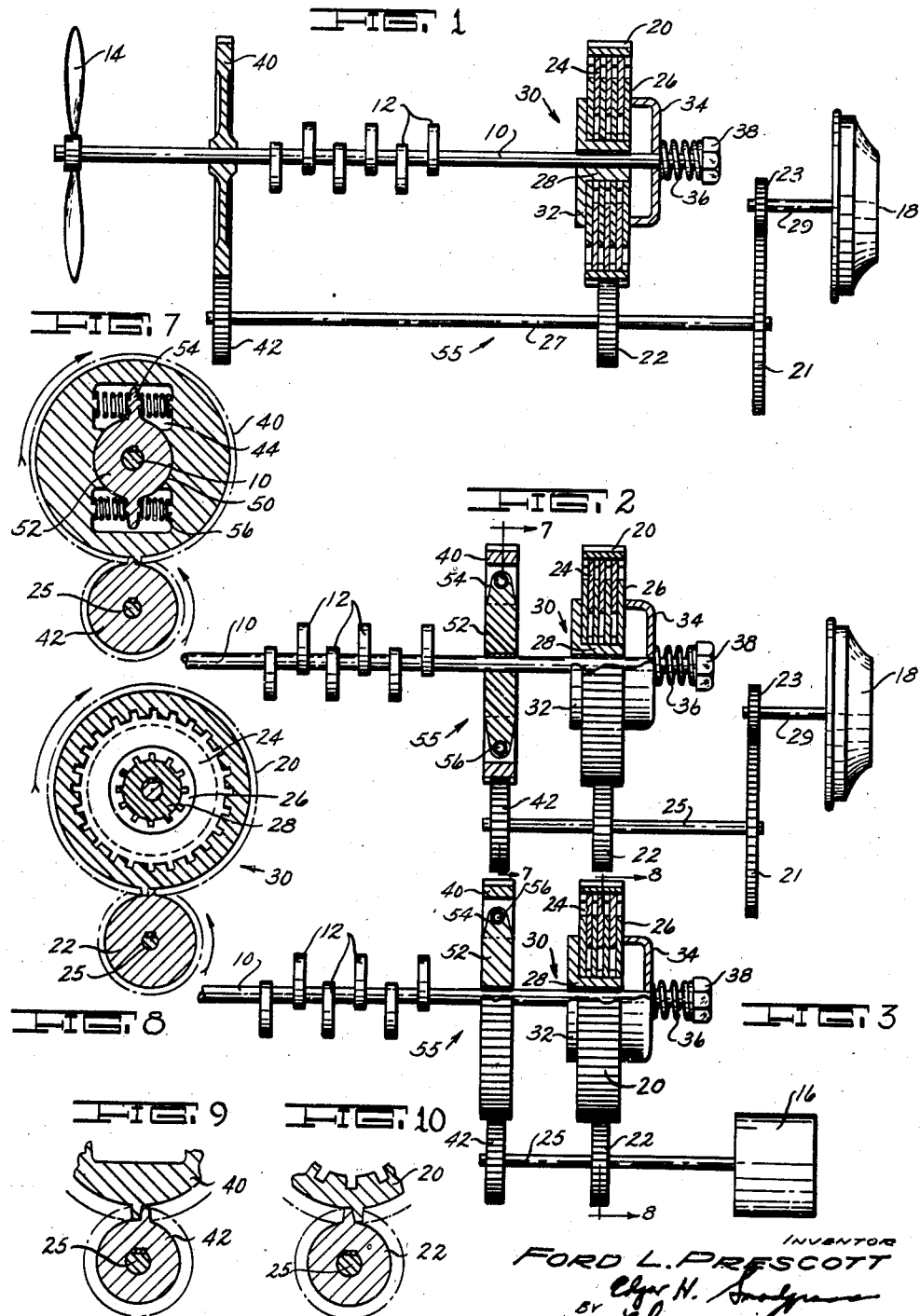
INVENTOR
FORD L. PRESCOTT
BY
ATTORNEYS Nov. 2, 1943.   F. L. PRESCOTT   2,333,122
TORSIONAL VIBRATION DAMPING MEANS
Filed July 11, 1941   2 Sheets-Sheet 2
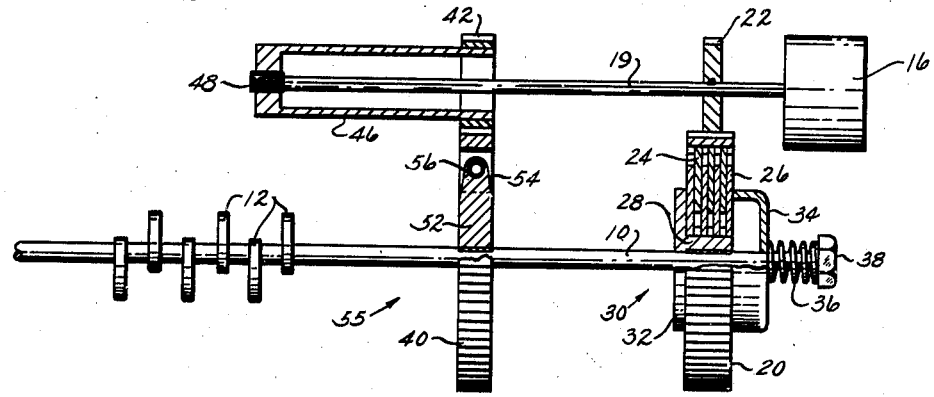
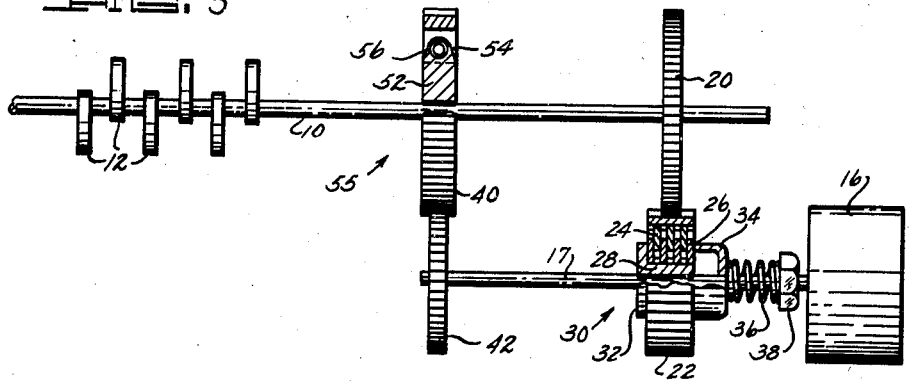
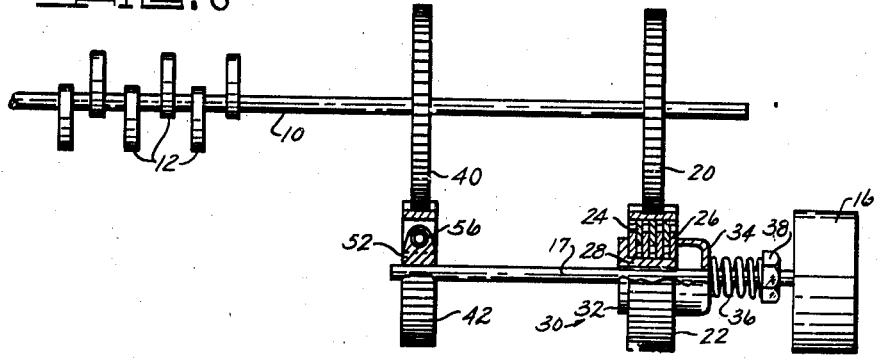
INVENTOR
FORD L. PRESCOTT Patented Nov. 2, 1943

2,333,122

UNITED STATES PATENT OFFICE 2,333,122

TORSIONAL VIBRATION DAMPING MEANS

Ford L. Prescott, Dayton, Ohio

Application July 11, 1941, Serial No. 402,036

11 Claims. (Cl. 74—574)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to mechanism for damping out torsional vibrations, and is particularly applicable to internal combustion engines, or other engines having intermittent power impulses.

The destructive results of critical torsional vibrations, which occur when resonance or approximate resonance exists between the impressed impulses and the natural frequency of the engine crank shaft, are well known, and various devices have been developed for obviating or minimizing these results.

Among the devices known in this art is a class, the object of which is to cause the vibrating parts to move through a certain path and thereby do work in overcoming a resistance such as friction or the like, and it is to this general class that the present invention belongs.

The application of the known devices of this class have, however, shown them to have very serious fundamental defects, in that the friction elements have heretofore always been so made that, in order to do work, the vibration forces had first to break the static friction between the friction elements of the device before work could be done. Therefore, when the friction means was so adjusted that the vibration forces could break the static friction, very little work was thereafter required to maintain the corresponding sliding friction once the static friction was broken. Conversely, if the friction elements were so adjusted that the sliding friction alone would balance the vibration forces, then the corresponding static friction would require a force greater than the vibration force to break it. In either event such a device is ineffective.

It is therefore an object of this invention to so construct and arrange the parts of a device of this character that a static condition can never occur between the friction elements, such a result being achieved by keeping them always in sliding engagement with each other when the device is operating, then providing means whereby they may be so adjusted that the sliding friction balances or substantially balances the vibration forces which they are intended to damp.

The friction device heretofore mentioned is preferably interposed between the engine crankshaft and a countershaft carrying an auxiliary rotating mass, the two shafts being connected by gearing, and in this case it may be advantageous to step up the speed of the auxiliary rotating mass by an appropriate gear ratio. Since the effect of the auxiliary mass is proportional to the square of the speed, a smaller auxiliary mass may thus be used.

When a supercharger is used it may be advantageous to employ its rotor as an auxiliary mass since provision to drive the rotor must, in any event, be made.

Where the auxiliary mass is gear driven at high speed, the gearing is preferably cut with minimum backlash since the auxiliary mass is alternately the driver then the driven when employed to damp out vibration, but even when cut according to the best engineering practice, the effect of backlash is still noticeable.

It is therefore another object of this invention to so construct and arrange the elements of the device that backlash in certain of the gearing will be entirely eliminated without the addition of any parts not already required for other functions.

Other objects and advantages will hereinafter appear from the detailed description aided by the drawings, wherein:

Fig. 1 is a schematic view of an embodiment of the invention wherein an impulse engine has a mean inertia mass in the form of a propeller which smooths out most of the torsional vibration in the engine shaft, and an auxiliary inertia mass in the form of a supercharger rotor, the engine being provided with a long slender countershaft which supplies the necessary resilient means in the drive between the engine shaft and the auxiliary inertia mass whereby the driving end of the countershaft may be slightly vibratory, and the driven end at the supercharger will be steady, and another drive between the steady end of the countershaft and the vibratory engine shaft, there being a friction clutch in the latter drive whereby one element of the friction clutch takes the rotation from the vibratory engine shaft, and the other element of the clutch takes its rotation from the steady end of the countershaft.

Fig. 2 is a schematic view similar to Fig. 1, except that instead of depending on a long slender countershaft to provide the resiliency which must exist in the drive between the engine shaft and the auxiliary inertia mass, a coil spring drive is substituted for the long shaft.

Fig. 3 is a schematic view similar to Fig. 2, except that the auxiliary inertia mass, which in Fig. 2 is the geared up rotor of the supercharger, in Fig. 3 is a small fly wheel fixed directly to the countershaft, other structure of Fig. 3 being exactly like Fig. 2.

Fig. 4 is a schematic view of a modification in which the required resiliency in the drive from the engine to the auxiliary inertia mass is by means of a long cylinder countershaft with a tubular addition which adds to its resiliency without taking up more length.

Fig. 5 is a schematic view which corresponds to Fig. 3 except that the friction clutch is supported on the countershaft instead of on the engine shaft.

Fig. 6 is a schematic view like Fig. 5, except that both the spring drive and the friction clutch are on the countershaft.

Fig. 7 is a transverse section taken at 7—7 of Fig. 2, showing the resilient drive in one of the pairs of gears.

Fig. 8 is a transverse section taken at 8—8 of Fig. 3, showing the friction drive in another pair of the gears.

Fig. 9 is a fragmentary section similar to Fig. 7, provided to illustrate the direction of tooth pressure in several of the gears.

Fig. 10 is a fragmentary section similar to Fig. 8, provided to illustrate the direction of tooth pressure in several other gears.

Since a device of this kind is especially needed in aircraft engines, the exemplifications shown are, in greater part, directed to such engines, but it will be understood that the invention is not limited to such applications.

In the drawings in which, it will be remembered, the views are only schematic, the shaft 10 carries the rotating masses 12 of the engine. The propeller 14 is axially spaced apart from the engine masses only to illustrate that a certain degree of torsional flexibility may exist between the engine and propeller.

In all the several variants of the device shown, an auxiliary rotating mass is provided. This may consist of a small flywheel 16, especially provided for the purpose and keyed directly to the countershafts 25 or 19, Figs. 3 and 4 respectively, or, if desired, the impeller 18 of the supercharger (see Figs. 1 and 2), ordinarily a part of an aircraft power plant, may be used, in which case an extra pair of gears 21 and 23 may be included to connect the countersahfts 25, 27, and impeller shaft 29 to further increase the impeller speed, the parts 21 and 23 thereby becoming a part of the auxiliary rotating mass.

In either event the auxiliary rotating mass is connected to the engine shaft 10 through a pair of gears 20 and 22, and, since the inertia effect of the mass 16, or 18, is proportionate to the square of the revolutions, the gear 22 is preferably, although not necessarily, made much smaller than the gear 20, a gear 22 being drivably secured to each of the countershafts 17, 19, 25, 27.

A friction clutch comprises a series of discs 24 having external notches in driving engagement with internal notches in gear 20, interspaced with a series of discs 26 having internal notches in driving engagement with external notches in the gear hub 28. The hub 28 is keyed or similarly secured to the crankshaft 10 and has a flange 32 on one side against which the discs 24 and 26 are compressed by a cupped plate 34. A spring 36 whose stress is regulated by a nut 38 forces the plate 34 against the discs. While a disc clutch is employed in all of the embodiments shown, any other type of clutch will serve the purpose equally if the proper degree of resistance to slippage is furnished thereby. The clutch parts 24, 26, 28, 32, 34, 36 and 38 may be collectively referred to as the clutch drive 30.

In Figs. 1 through 4 the clutch drive 30 is incorporated in the gear 20 because, in these examples of the invention, the gear 20 is larger than the gear 22 and for that reason affords more space for the clutch. It will be seen, however, that the clutch drive may be equally operative if incorporated in or associated with the gear 22 when that gear is so designed as to accommodate it (see Figs. 5 and 6).

The auxiliary rotating mass is also connected to the engine shaft 10 through a second pair of gears 40 and 42, a gear 40 being secured to the shaft 10 and a gear 42 to a countershaft 17, 19, 25 or 27. This second pair is in parallel with the first, that is, either pair would operate to drivably connect the engine shaft to the auxiliary rotating mass if the other pair were removed.

Somewhere in the drive provided by this second pair of gears, 40 and 42, preferably somewhere between the engine shaft 10 and the gear 22, a resilient means is interposed. In Fig. 1, the required resiliency is gotten by so placing the gears 40 and 42 that the countershaft 27 is necessarily of considerable length. It should also be of small diameter and made of a material having a high degree of torsional elasticity.

Where the two pairs of gears 40, 42 and 20, 22 are for any reason preferably set close together, an arrangement as shown in Fig. 4 may be made, where the required resiliency is secured by providing the gear 42 with a long hollow hub 46 and extending a countershaft 19 through the hollow hub, the shaft and hub having a splined or equivalent connection at 48. The wall of the hub 46 is thin and the torsional deflection of the shaft 19 and hub 46 are additive.

In Figs. 2, 3, and 5 the requisite resilient drive is had by an arrangement wherein the gear 40 is provided with openings 44 and bearing surfaces 50 for a loose hub 52 which is secured to the shaft 10, or, as in Fig. 6, to shaft 17. The hub 52 has ears 54 which extend into the openings 44, and pairs of springs 56 normally hold the ears 54 midway in the openings. For convenience in further description, the resilient drive in any of its forms may be broadly designated by the numeral 55. In any of its forms it had best be made so that torsional displacement in the engine shaft will be limited to one or two degrees from normal uniform rotation.

With two parallel drives arranged as shown, the auxiliary rotating mass 16 or 18 will always maintain the rotative speed of the gear 20 substantially constant while its frictionally connected hub 28 will always have impressed thereon the torsional vibration of the shaft 10. Thus a gain or loss in angular velocity of the shaft 10 is opposed both by the cumulative resistance of the springs 56 and the work required in slipping the clutch drive 30, although the work done by the shaft 10 in stressing the resilient drive 55 is returned to the shaft while that expended in slipping the clutch drive 30 is lost.

Obviously then where the two pairs of gears 20, 22 and 40, 42 have the same speed ratio, each time a reversal in the resilient drive 55 occurs, the clutch drive 30 will also reverse, that is, the hub 28 will gain on the gear 20, then both hub and gear will momentarily have the same speed, then the gear will gain on the hub.

Under the above conditions, at each reversal in the clutch drive 30, a condition of static friction will momentarily obtain which must be broken if the friction drive is to become operative. If the spring 36 is weakened until the torsional vibration can break the static friction, then there is very little work to be done in overcoming the sliding friction, which is so much less, and if the spring is put under greater stress so that the sliding friction will balance the torsional vibration, then the torsional vibration will not be of great enough force to break the static friction which exists when the gear 20 and hub 28 have come to the same speed.

The overcoming of the foregoing disadvantage is one of the salient features of this invention and consists in providing a small difference in the ratio between the two pairs of gears 20, 22 and 40, 42. This small difference may be so selected that the gear 20 will rotate faster than the gear 40, or it may be so selected that the gear 20 will rotate slower than the gear 40.

In either event there will, at all times, be a difference in rotative speed between the gear 20 and its hub 28 and therefore there will always be some sliding friction taking place in clutch drive 30. When then the torsional oscillations of the shaft 10 are impressed on the hub 28, the effect is merely to alternately increase and decrease the normal difference in speed between the clutch parts, which are in sliding frictional engagement, and it will at no time be necessary for the torsional oscillations to break a static frictional contact between the friction elements of the clutch drive.

The hereinbefore described novel arrangement for balancing the vibratory forces against the sliding friction is not only a distinct advantage, but it is a necessity if the device is to function with any considerable degree of efficiency, but while the results of the arrangement above described are highly important, there is still another advantage inherent in the device which accrues without modification in its structure. This additional advantage may be best described by reference to Figs. 7 and 8 where, for illustrative purposes, one tooth only of each gear is shown.

Assume, for instance, that the ratios of the two pairs of gears 20, 22 and 40, 42 are such that the gear 20 must gain rotations with respect to its hub 28. This may be done by making the gear 20 slightly smaller or perhaps merely with a less number of teeth than the gear 40.

Assume rotation to be in the direction of the arrows, Figs. 7 and 8, the gear 40 driving the gear 42. The gear 22 is fast on the same shaft as 42, and the gear 22 drives the gear 20. Obviously, the countershaft 25, Figs. 3 or 2, is urged to rotate anticlockwise by gear 40 acting through gear 42 and restrained in anticlockwise rotation by having to drive the gear 20 by the gear 22 against frictional resistance.

Assume on the other hand that the ratios of the two pairs of gears 20, 22 and 40, 42 are such that the gear 20 must lose rotations with respect to its hub 28. This may be done by making the gear 20 slightly larger or perhaps merely with a greater number of teeth than gear 40.

With rotation in the direction of the arrows in Figs. 7 and 8, the larger gear 20 rotates the gear 22 anticlockwise, the tooth pressure being opposite to that shown in Fig. 8, that is, as shown in Fig. 10. The gear 42 is driven anticlockwise through the countershaft 25 and in turn drives the gear 40, the pressure between the teeth being as indicated in Fig. 9. In this case the gear 40 merely restrains the gear 20 from driving the countershaft as fast as it otherwise would.

The result is therefore the same whether the ratio of the pair of gears 20, 22 is greater or less than the ratio of the pair of gears 40, 42, that is, the arrangement provides a perfect self adjusting anti-backlash device for the gearing, a feature which is quite important and highly desirable where torsional vibration is present in the drive.

The amount of difference in the ratio between the two pairs of gears 20, 22 and 40, 42 is preferably, although not necessarily, held within specified limits, for, if the difference is greater than necessary, an undue amount of wear and wasted energy will result from too high a rate of sliding friction in the clutch drive. Conversely, if the difference in ratio is less than a given amount, a static condition may be reached between the friction elements at one period of rotation.

Thus, for instance, with a twelve cylinder engine, a power stroke is impressed on the shaft 10 every sixty degrees rotation. If now the torsional vibration, at resonance, angularly displaces the shaft 10 as much as one degree rotation, then the difference in ratio of the two pairs of gears should be such that the gain or loss of the gear 20 with respect to its hub 28 is somewhat more than one degree in sixty, for otherwise the gear and hub will at some point reach the same rotative speed and a static condition will momentarily exist between the friction elements of the clutch drive 30, which is a condition sought to be avoided by the invention.

While in all of the views showing embodiments of the invention, toothed spur gearing is shown as the driving means, it will be understood that, helical, bevel, or chain gearing may be substituted with proper modification in the arrangement.

Having shown and described several structural variants of the inventive concept, I claim:

1. In a vibration damping device for an impulse engine, an engine driven shaft, a main inertia mass on said engine driven shaft, a countershaft, an auxiliary inertia mass driven by said engine through said countershaft, a drive from the engine driven shaft through the countershaft to the auxiliary inertia mass which includes an engine shaft gear, a countershaft gear and a friction means through which slight slippage in said drive may occur, a second drive from the engine driven shaft having a slightly different ratio from the first, through the countershaft to the auxiliary inertia mass which includes a second engine shaft gear, a second countershaft gear and a resilient means in the drive for absorbing slight torsional vibration in the engine shaft.

2. In a vibration damping device for an impulse engine, an engine shaft, a countershaft, an auxiliary inertia mass rotatable by said engine through said countershaft, a drive from the engine shaft through the countershaft to the auxiliary inertia mass which includes an engine shaft gear, a countershaft gear and a friction device through which slight slippage in the drive may be compelled, a second drive from the engine shaft through the countershaft to the auxiliary inertia mass which includes a second engine shaft gear, a second countershaft gear and a resilient means for yielding to torsional vibration in the engine shaft, the several gears being such that there is a slight difference in the speed ratio of the two said drives.

3. In a vibration damping device of the character described, an engine, an engine shaft, a main inertia mass on said engine shaft, a countershaft, an auxiliary mass rotatable by said engine through said countershaft, two parallel power transmitting means of slightly different ratios, one of which includes a pair of toothed gears and a friction drive connecting the engine and the countershaft, and the second of which includes a pair of toothed gears and a resilient drive which is responsive to limited angular displacement of the engine shaft in either direction of rotation from its normal position with respect to the rotation of the auxiliary mass.

4. In a vibration damping device of the character described, an engine, an engine shaft, a countershaft, an auxiliary mass rotatably driven by said engine through said countershaft, two parallel power transmitting drives of slightly different ratios extending from the engine shaft through the countershaft to the auxiliary mass, one drive including a pair of gears and a friction clutch connecting the engine shaft and the countershaft, said friction clutch having adjusting means for balancing said friction against the torsional vibration in the engine shaft, and the second of which includes a pair of gears and a resilient means responsive to slight angular displacement in the rotational position of the engine shaft with respect to the rotational position of the auxiliary mass.

5. In a vibration damping device for an impulse driven engine, an engine driven shaft, an auxiliary inertia mass, two parallel drives of different ratios for rotating said auxiliary inertia mass by said engine driven shaft, one drive including a pair of gears with a device for allowing slippage in the drive, and the other including a pair of gears and a long slender shaft resiliently yieldable from torsional deflection in the engine shaft.

6. In a vibration damping device for an impulse engine, an engine shaft, an auxiliary rotatable mass, two parallel power transmitting drives for rotating said auxiliary rotatable mass by said engine shaft, one drive including a pair of gears with a device for allowing slippage in the drive, and the other including a pair of gears of different speed ratio from the first set and a long slender shaft for absorbing the torsional deflections in the engine shaft due to the engine impulses.

7. In a vibration damping device for an impulse driven engine, a shaft rotatable by engine impulses, a main rotatable mass, a countershaft, an auxiliary rotatable mass driven by said engine through said countershaft, a hub on the engine shaft, a gear on said hub, a friction device connecting said gear and hub, a second hub on the engine shaft, a second gear on said second hub, a resilient means connecting said second gear and second hub for limited angular displacement between said second gear and said second hub, and two gears on the countershaft arranged to be driven one by each of the engine shaft gears, rotation of one of the engine shaft gears being slightly faster than the other.

8. A vibration damping device for an impulse engine which comprises, in combination, an impulse driven engine shaft, a countershaft, an auxiliary rotatable mass driven through said countershaft, two hubs on the engine shaft, two gears on said hubs, two gears on the countershaft arranged to be driven respectively by the two first mentioned gears, a slippage device connecting one of the hubs to its gear, and a resilient device connecting the other of said hubs to its gear, one of the pairs of gears connecting the engine shaft and the countershaft having a higher speed ratio than the other pair.

9. In a vibration damping device for an impulse driven engine, an engine shaft, a main inertia mass thereon, a countershaft, an auxiliary inertia mass driven by said engine shaft through said countershaft, a pair of gears, one on the engine shaft and the other on the countershaft, the countershaft gear of the pair having a loose hub and a slippage device between the gear and hub, a second pair of gears of different ratio than the first pair, one on the engine shaft and the other on the countershaft, the engine shaft gear of the second pair having a loose hub and a resilient means connecting the shaft and hub.

10. In a vibration damping device for an impulse engine, an engine shaft, a countershaft, an auxiliary rotating mass driven by said engine shaft through said countershaft, a pair of gears one on the engine shaft and the other on the countershaft, the countershaft gear of the pair having a loose hub and a slippage device between the gear and hub, a second pair of gears of different ratio than the first, one on the engine shaft and the other on the countershaft, the countershaft gear of the second pair having a loose hub and a resilient means connecting the shaft and hub.

11. In a vibration damping device for an impulse driven engine, an engine driven shaft, a countershaft, an auxiliary inertia mass rotatable by said engine shaft, a drive from the engine shaft through the countershaft to the auxiliary inertia mass which includes an engine shaft gear, a countershaft gear and a friction means through which slight slippage in the drive may occur, a second drive from the engine shaft through the countershaft to the auxiliary inertia mass which includes a second engine shaft gear, a second countershaft gear and a resilient means which yieldably permits slight displacement in either direction of rotation from normal position of the engine shaft with respect to the auxiliary inertia mass, the ratio of driver to driven in the two drives being such as to compel a rate of angular displacement of driver to driven in the friction means which is always in excess of the rate of angular displacement of driver to driven in the resilient means, whereby some slippage in the friction means is at all times assured when the said device is operative.

FORD L. PRESCOTT.